(12) United States Patent
St. Laurent et al.

(10) Patent No.: US 9,811,522 B2
(45) Date of Patent: *Nov. 7, 2017

(54) SYSTEM AND METHOD FOR TRANSFORMING A SOURCE VIRTUAL MACHINE WITHOUT COPYING OF PAYLOAD DATA

(71) Applicant: HEWLETT PACKARD ENTERPRISE DEVELOPMENT LP, Houston, TX (US)

(72) Inventors: Jesse St. Laurent, Westford, MA (US); James E. King, III, Westford, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,652

(22) Filed: May 21, 2015

(65) Prior Publication Data
US 2015/0254256 A1 Sep. 10, 2015

Related U.S. Application Data

(63) Continuation of application No. 13/972,555, filed on Aug. 21, 2013, now Pat. No. 9,043,576.

(51) Int. Cl.
G06F 12/00 (2006.01)
G06F 17/30 (2006.01)
G06F 9/455 (2006.01)

(52) U.S. Cl.
CPC .... *G06F 17/30076* (2013.01); *G06F 9/45558* (2013.01); *G06F 17/30221* (2013.01); *G06F 17/30233* (2013.01); *G06F 2009/4557* (2013.01)

(58) Field of Classification Search
CPC .. G06F 3/0661; G06F 3/0668; G06F 12/0284; G06F 12/0692; G06F 12/1009;
(Continued)

(56) References Cited

U.S. PATENT DOCUMENTS 7,139,781 B2 11/2006 Young
7,454,592 B1 11/2008 Shah
(Continued)

OTHER PUBLICATIONS

Int'l. Search Report and Written Opinion dated Nov. 3, 2014 from Int'l. Appln. No. PCT/US2014/051855.
(Continued)

*Primary Examiner* — Reba I Elmore
(74) *Attorney, Agent, or Firm* — Hewlett Packard Enterprise Patent Department

(57) ABSTRACT

System and method for conversion of virtual machine files without requiring copying of the virtual machine payload (data) from one location to another location. By eliminating this step, applicant's invention significantly enhances the efficiency of the conversion process. In one embodiment, a file system or storage system provides indirections to locations of data elements stored on a persistent storage media. A source virtual machine file includes hypervisor metadata (HM) data elements in one hypervisor file format, and virtual machine payload (VMP) data elements. The source virtual machine file is converted by transforming the HM data elements of the source file to create destination HM data elements in a destination hypervisor format different from the source hypervisor format; maintaining the locations of the VMP data elements stored on the persistent storage media constant during the conversion from source to destination file formats without reading or writing the VMP data elements; and creating indirections to reference the destination HM data elements in the destination hypervisor format and the existing stored VMP data elements.

20 Claims, 13 Drawing Sheets

(58) Field of Classification Search
CPC .. G06F 13/385; G06F 13/387; G06F 12/0292; G06F 12/1036; G06F 12/109; G06F 17/30026; G06F 17/30221; G06F 17/30233; G06F 9/4558; G06F 2009/4557
USPC ................. 711/203, 206; 712/213, 223, 225; 717/149, 176; 718/104
See application file for complete search history.

(56) References Cited

U.S. PATENT DOCUMENTS

| | | | |
|---|---|---|---|
| 7,747,663 | B2 | 6/2010 | Atkin et al. |
| 7,814,078 | B1 | 10/2010 | Forman |
| 7,996,835 | B2* | 8/2011 | Griffith ................. G06F 9/5077 710/260 |
| 8,140,625 | B2 | 3/2012 | Dubnicki et al. |
| 8,478,799 | B2 | 7/2013 | Beaverson et al. |
| 8,539,484 | B1* | 9/2013 | Offer ................................ 718/1 |
| 8,984,503 | B2* | 3/2015 | Poddar .................... G06F 9/455 717/173 |
| 2004/0148306 | A1 | 7/2004 | Moulton et al. |
| 2006/0036898 | A1 | 2/2006 | Doering |
| 2008/0263258 | A1* | 10/2008 | Allwell .................... G06F 9/461 711/6 |
| 2010/0107160 | A1 | 4/2010 | Srinivasan |
| 2010/0299368 | A1* | 11/2010 | Hutchins ........... G06F 17/30115 707/803 |
| 2010/0306355 | A1* | 12/2010 | Lagergren ................. G06F 8/61 709/222 |
| 2011/0078680 | A1* | 3/2011 | Lagergren ............. G06F 9/5077 718/1 |
| 2011/0161952 | A1* | 6/2011 | Poddar .............. G06F 17/30247 717/173 |
| 2012/0054746 | A1* | 3/2012 | Vaghani ................. G06F 9/5022 718/1 |
| 2012/0180035 | A1* | 7/2012 | Poddar .............. G06F 17/30247 717/168 |
| 2012/0278806 | A1* | 11/2012 | Wade .................. G06F 9/45558 718/1 |
| 2012/0331242 | A1* | 12/2012 | Shaikh ................ G06F 12/0261 711/154 |
| 2013/0139155 | A1* | 5/2013 | Shah .................. G06F 9/45558 718/1 |
| 2013/0305246 | A1 | 11/2013 | Goggin et al. |
| 2013/0311763 | A1* | 11/2013 | Saborowski ............ G06F 9/445 713/2 |
| 2014/0143389 | A1* | 5/2014 | Lagergren ............. G06F 9/4401 709/220 |
| 2014/0149981 | A1* | 5/2014 | Luxenberg .......... H04L 49/9005 718/1 |
| 2014/0156925 | A1 | 6/2014 | Baron et al. |
| 2014/0282548 | A1* | 9/2014 | Lagergren ............. G06F 9/5077 718/1 |
| 2015/0058562 | A1* | 2/2015 | Vaghani ................. G06F 9/5022 711/114 |
| 2015/0195137 | A1* | 7/2015 | Kashyap ............. H04L 41/0893 370/254 |

OTHER PUBLICATIONS

Celesti, A., et al., Improving Virtual Machine Migration in Federated Cloud Environments, 2010 Second Int'l. Conference on Evolving Internet, Sep. 20, 2010, 61-67, Piscataway, NJ, USA.
Van Hoecke, S., et al., Efficient Management of Hybrid Clouds, Cloud Computing 2011: The Second Int'l. Conference on Cloud Computing, GRIDs, and Virtualization, Jan. 1, 2011, 167-172.
Card Verification Solutions LLC v. Citigroup Inc., 2014 WL 4922524 (N.D. Ill. Sep. 29, 2014).
Finjan Inc. v. Blue Coat Systems, Inc., case No. 5-13-CV-03999 (N.D. Cal. Nov. 20, 2015).
Genband US LLC v. Metaswitch Networks Corp., et al., case No. 2:14-CV-00033 (E.D. Tex. Jan. 8, 2016).
USPTO PTAB Decision Denying Institution of Inter Partes Review entered Mar. 22, 2017, Springpath, Inc. v. SimpliVity Corp., Case IPR2016-01780, U.S. Pat. No. 8,478,799 B2.
USPTO PTAB Patent Owner's Preliminary Response dated Dec. 27, 2016, Springpath, Inc. v. SimpliVity Corp., Case IPR2016-01780, U.S. Pat. No. 8,478,799 B2 (SimpliVity Exhibits 2001-2009 identical to IPR2016-01779 and previously submitted).
Petition for Inter Partes Review of U.S. Pat. No. 8,478,799 before the USPTO Patent Trial and Appeal Board dated Sep. 14, 2016, Case IPR2016-01779.
Declaration of Darrell D.E.Long, Ph.D. Regarding U.S. Pat. No. 8,478,799 dated Sep. 14, 2016, Case IPR2016-01779 (Springpath Exhibit 1002).
Li, et al., Secure Untrusted Data Repository (SUNDR), OSDI '04: 6th Symposium on Operating Systems Design and Implementation, pp. 122-136, USENIX Association (Springpath Exhibits 1003 & 1103).
Sandberg, et al., Design and Implementation of the Sun Network Filesystem, Sun Microsystems, Mountain View, CA, (12 pp.) (Springpath Exhibits 1004 & 1116).
U.S. non-final Office Action dated Aug. 30, 2012 in U.S. Appl. No. 12/823,922 (Springpath Exhibits 1006 & 1106).
Response to U.S. non-final Office Action dated Aug. 30, 2012 filed Dec. 18, 2012 in U.S. Appl. No. 12/823,922 (Springpath Exhibits 1009 & 1109).
Quinlan, et al., Venti: a new approach to archival storage, Bell Labs, Lucent Technologies, 1-13 pp (Springpath Exhibits 1008 & 1108).
U.S. final Office Action dated Feb. 22, 2013 in U.S. Appl. No. 12/823,922 (Springpath Exhibits 1010 & 1110).
Response to U.S. final Office Action dated Feb. 22, 2013 filed May 8, 2013 in U.S. Appl. No. 12/823,922 (Springpath Exhibits 1012 & 1112).
Best, et al., How the Journaled File System handles the on-disk layout, May 2000, IBM: developerWorks: Linux library/Open source library Internet download Apr. 18, 2001; http://swgiwas001.sby.ibm.com/developerworks/library/jfslayout/index1.html (Springpath Exhibits 1011 & 1111).
U.S. Notice of Allowance dated May 29, 2013 in U.S. Appl. No. 12/823,922 (Springpath Exhibits 1013 & 1113).
Petition for Inter Partes Review of U.S. Pat. No. 8,478,799 before the USPTO Patent Trial and Appeal Board dated Sep. 14, 2016, Case IPR2016-01780.
Declaration of Darrell D.E.Long, Ph.D. Regarding U.S. Pat. No. 8,478,799 dated Sep. 14, 2016, Case IPR2016-01780 (Springpath Exhibit 1102).
IEEE The Open Group, 1003.1TM Standard for Information Technology—Portable Operating System Interface (POSIX (R)) System Interfaces, Issue 6, IEEE Std 1003.1-2001, Approved Sep. 12, 2001 The Open Group (2 pp.) (Springpath Exhhibits 1014 & 1114).
IEEE The Open Group, 1003.1TM Standard for Information Technology—Portable Operating System Interface (POSIX (R)) Base Definitions, Issue 6, IEEE Std 1003.1-2001, Approved Sep. 12, 2001 The Open Group (8 pp.) (Springpath Exhibits1015 & 1115).
Springpath Inc.'s Preliminary Invalidity Contentions, C.A. No. 4:15-cv-13345-TSH Document 101, filed Mar. 21, 2017 in the US District Court for the District of Massachusetts and Exhibit A1.
Li et al., Secure Untrusted Data Repository (SUNDR), 2004 ("Li").
Sanberg et al., Design and implementation of the Sun network filesystem, 1985 ("Sandberg").
Quinlan et al., Venti: A New Approach to Archival Storage, 2002 ("Quinlan").
Best et al., JFS Layout: How the Journaled File System Handles to On-Disk Layout, 2000 ("Best").
Zhu et al., Avoiding the Disk Bottleneck in the Data Domain Deduplication File System, 2008 ("Zhu").
Abd-El-Malek et al., Ursa Minor: Versatile Cluster-Based Storage, 2005 ("Abd-El-Malek").
Bobbarjung et al., Improving Duplicate Elimination in Storage Systems, 2006 ("Bobbarjung").
Cox et al., Pastiche: Making Backup Cheap and Easy, 2002 ("Cox").
Dabek et al., Wide-Area Cooperative Storage With CFS, 2001 ("Dabek").

(56) References Cited

OTHER PUBLICATIONS

Debnath et al., ChunkStash: Speeding up Inline Storage Deduplication Using Flash Memory, 2010 ("Debnath").
Fu et al., Fast and Secure Distributed Read-Only File System, 2000 ("Fu 2000").
Fu et al., Fast and Secure Distributed Read-Only File System, 2002 ("Fu").
Mesnier et al., Object-Based Storage, 2003 ("Mesnier").
Muthitacharoen et al., Ivy: A Read/Write Peer-to-Peer File System, 2002 ("Muthitacharoen").
Rhea et al., Fast, Inexpensive Content-Addressed Storage in Foundation, 2008 ("Rhea").
Richie et al., The UNIX Time-Sharing System, 1974 ("Richie").
Levanoni et al., An On-the-Fly Reference-Counting Garbage Collector for Java, 2001 ("Levanoni").
Boehm et al., Garbage Collection in an Uncooperative Environment, 1998 ("Boehm").
1003.1™ Standard for Information Technology—Portable Operating System Interface (POSIX®), System Interfaces, Issue 6, 2001 ("POSIX_SI_2001").
Harel Paz, Efficient Memory Management for Servers, 2006 ("Paz").
Grembowski et al., Comparative Analysis of the Hardware Implementations of Hash Functions SHA-1 and SHA-512, 2002 ("Grembowski").
Chaves et al., Cost-Efficient SHA Hardware Accelerators, 2008 ("Chaves").
Hitz et al., File System Design for an NFS File Server Appliance, 1994 ("Hitz").
Kawaguchi et al., A Flash-Memory Based File System, 1995 ("Kawaguchi").
You et al., Deep Store: An Archival Storage System Architecture, 2005 ("You").
McKusick et al., A fast file system for UNIX, 1984 ("McKusick").
The EMC Centera and TOWER Technology Advantage, 2002 ("Centera").
Hutchinson et al., Logical vs. Physical File System Backup, 1999 ("Hutchinson").
IBM, AIX 5L Version 5.2 General Programming Concepts: Writing and Debugging Programs, 2004 ("GPC").
IBM, AIX 5L Version 5.2 System Management Concepts: Operating System and Devices, 2004 ("SMC").
USPTO PTAB Decision Denying Institution of Inter Partes Review entered Mar. 22, 2017, *Springpath, Inc.* v. *SimpliVity Corp.*, Case IPR2016-01779, U.S. Pat. No. 8,478,799 B2.
USPTO PTAB Patent Owner's Preliminary Response dated Dec. 27, 2016, *Springpath, Inc.* v. *SimpliVity Corp.*, Case IPR2016-01779, U.S. Pat. No. 8,478,799 B2 (SimpliVity Exhibits 2001-2009 listed below).
Wikipedia: "Object Storage" (available at https://en.wikipedia.org/wiki/Object_storage) (last visited Dec. 6, 2016), SimpliVity Exhibit 2001, *Springpath* v. *SimpliVity* IPR2016-01779.
Webopedia: "Inode" (available at http://www.webopedia.com/TERM/I/inode.html) (last visited Dec. 20, 2016), SimpliVity Exhibit 2002, *Springpath* v. *SimpliVity* IPR2016-01779.
Presentation: "Object Storage technology," Storage Networking Industry Association, 2013 (available at http://www.snia.org/sites/default/education/tutorials/2013/spring/file/BrentWelch_Object_Storage_Technology.pdf) (last visited Dec. 22, 2016), SimpliVity Exhibit 2003, *Springpath* v. *SimpliVity* IPR2016-01779.
"Object Storage versus Block Storage: Understanding the Technology Differences," Aug. 14, 2014 (available at http://www.druva.com/blog/object-storage-versus-block-storage-understanding-technology-differences/) (last visited Dec. 22, 2016), SimpliVity Exhibit 2004, *Springpath* v. *SimpliVity* IPR2016-01779.
"Understanding Object Storage and Block Storage use cases," Jul. 20, 2015 (available at http://cloudacademy.com/blog/object-storage-block-storage/) (last visited Dec. 22, 2016), SimpliVity Exhibit 2005, *Springpath* v. *SimpliVity* IPR2016-01779.
"OBFS: A File System for Object-based Storage Devices." Feng, et al., 2004, SimpliVity Exhibit 2006, *Springpath* v. *SimpliVity* IPR2016-01779.
"Oasis: An active storage framework for object storage platform," Xie, et al., 2015, SimpliVity Exhibit 2007, *Springpath* v. *SimpliVity* IPR2016-01779.
Wikipedia: "Namespace" (available at https://en.wikipedia.org/wiki/Namespace) (last visited Dec. 6, 2016), SimpliVity Exhibit 2008, *Springpath* v. *SimpliVity* IPR2016-01779.
Weopedia: "Namespace" (available at http://www.webopedia.com/TERM/N/namespace.html) (last visited Dec. 20, 2016), SimpliVity Exhibit 2009, *Springpath* v. *SimpliVity* IPR2016-01779.

\* cited by examiner

SYSTEM AND METHOD FOR TRANSFORMING A SOURCE VIRTUAL MACHINE WITHOUT COPYING OF PAYLOAD DATA

RELATED APPLICATIONS

This application is a continuation of U.S. Ser. No. 13/972,555, entitled "System and Method for Virtual Machine Conversion" filed Aug. 21, 2013.

FIELD OF THE INVENTION

The present invention relates to transforming a virtual machine file from one hypervisor format to a different hypervisor format and more particularly to allowing such conversion without requiring migration of the payload data.

BACKGROUND

Hypervisors use various file-based structures to store virtual machine information for, but not limited to, configuration, memory content, and virtual disk content. These file based structures must be transformed in order to be compatible with a hypervisor of a different type.

Existing tools that convert virtual machine files are both migration and transformation tools, namely they encompass both migration (copying) of the data, and transformation of the entirety of the virtual machine file.

Data migration is what consumes most of the time in this type of operation. Eliminating it could for example change an hour long operation into mere seconds. This would be of particular benefit in the conversion of virtual disks.

Virtual disks are a type of file used by hypervisors to simulate a direct-attached hard drive on a virtual machine. Virtual disks are typically extremely large, on the order of many gigabytes (GB), or even terabytes (TB) of data. The tools that exist today to migrate virtual disks from one hypervisor format to another must make a copy of the data stored within the source virtual disk file, in order to store the data in another virtual disk file that is compatible with the destination hypervisor. Copying many gigabytes, or even terabytes of data is highly inefficient.

Thus, there is need for a more efficient system for converting a virtual machine file in one hypervisor format to a virtual machine file in another hypervisor format.

SUMMARY OF THE INVENTION

The present invention is a system and method that enables conversion of virtual machine files without requiring copying of the virtual machine payload (data) from one location to another location. By eliminating this step, applicant's invention significantly enhances the efficiency of the conversion process.

According to one embodiment of the invention, a method of converting virtual machine files is provided comprising:
in a file system or storage system providing indirections to locations of data elements stored on a persistent storage media;
converting a source virtual machine file comprising hypervisor metadata (HM) data elements in one hypervisor file format, and virtual machine payload (VMP) data elements, including steps of:
transforming the HM data elements of the source file to create destination HM data elements in a destination hypervisor format different from the source hypervisor format;
maintaining the locations of the VMP data elements stored on the persistent storage media constant during the conversion from source to destination file formats without reading or writing the VMP data elements; and
creating indirections to reference the destination HM data elements in the destination hypervisor format and the existing stored VMP data elements.

In one embodiment, the method further comprises removing the source HM data elements after creating the destination HM data elements.

In one embodiment, the source HM data elements include directory, file and indirection data elements.

In one embodiment, the source VM file is a source virtual disk VD file.

In one embodiment, the source VM file is a virtual memory image file.

In one embodiment, the method includes restoring the source VM file from backup storage for running the destination VM file on a hypervisor of the different format.

In one embodiment, the method further comprises updating the source VM file with the created indirections and renaming the updated source file in accordance with the different hypervisor format to create the destination VM file.

In one embodiment, the method includes cloning the source VM file to a different hypervisor format and maintaining the source file.

In one embodiment, a computer program is provided embodied in a non-transitory machine readable storage device comprising program code means which, when executed by a processor, performs the steps of the above recited methods.

In one embodiment, the method is implemented in one or more of digital electronic circuitry, computer hardware, firmware, a computer program in a non-transitory machine readable storage device, or combinations thereof.

In one embodiment, the method further comprises maintaining a location index of the file system for mapping data element names and physical locations of the data elements.

In one embodiment, the location index further comprises reference counts for the data elements.

In one embodiment, the names, location index and data elements comprise a file system.

In one embodiment, the mapping is indexed by an offset into the content of the file, and comprises a linear list, a tree structure, or an indirection table.

In one embodiment, the file system stores the data elements as objects in an object store located in the persistent storage media.

In one embodiment, each object has a globally unique name derived from the content of the object and used to access the object in the object store.

In one embodiment, the method includes adding, modifying or deleting an object of the file and generating a new file object name.

In one embodiment, the object store contains an index of object names, object physical locations and object reference counts.

In one embodiment, the object name comprises a hash digest of the object content.

In accordance with another embodiment of the invention, a computer system is provided for converting a virtual machine file from one hypervisor format to another hypervisor format, the system including a memory and a hardware processor in communication with the memory, the processor executing program instructions for converting the virtual machine file including steps of:

in a file system or storage system providing indirections to locations of data elements stored on a persistent storage media;

converting a source virtual machine file comprising hypervisor metadata (HM) data elements in one hypervisor file format, and virtual machine payload (VMP) data elements, including steps of:

transforming the HM data elements of the source file to create destination HM data elements in a destination hypervisor format different from the source hypervisor format;

maintaining the locations of the VMP data elements stored on the persistent storage media constant during the conversion from source to destination file formats without reading or writing the VMP data elements; and creating indirections to reference the destination HM data elements in the destination hypervisor format and the existing stored VMP data elements.

In accordance with another embodiment of the invention, a method of converting virtual machine files is provided comprising:

in a file system or storage system where data and metadata are stored as objects, each object having a globally unique content name derived from the content of the object and used to access the object in the file system or the storage system;

converting a source virtual machine file comprising hypervisor metadata in one hypervisor file format, and payload data, including steps of:

transforming the hypervisor metadata of the source file to a different hypervisor file format to create destination hypervisor metadata;

maintaining the locations of the stored payload data constant during the conversion from source to destination file format without reading or writing the payload data; and creating indirections for the destination hypervisor metadata and existing stored payload data.

In one embodiment of the invention, the source virtual machine file comprises metadata objects and payload objects that are stored in an object store for access by a file system. Each object has a globally unique object fingerprint derived from the content of the object and used to access the object store. This type of storage system has access into the content of the virtual machine file and can perform a conversion without migration of the virtual machine payload.

These and other features and benefits of the invention will be more particularly described in the following detailed description of various embodiments of the invention.

BRIEF DESCRIPTION OF THE FIGURES

FIG. 13A-13C illustrate one embodiment of the invention utilizing an object store, wherein FIG. 13A is a schematic diagram of an object store, its operational interfaces and location index, FIG. 13B is a directory data structure for mapping file inode numbers and file names, and FIG. 13C is an inode map data structure for mapping object names and file inode numbers.

DETAILED DESCRIPTION

Figure 1:
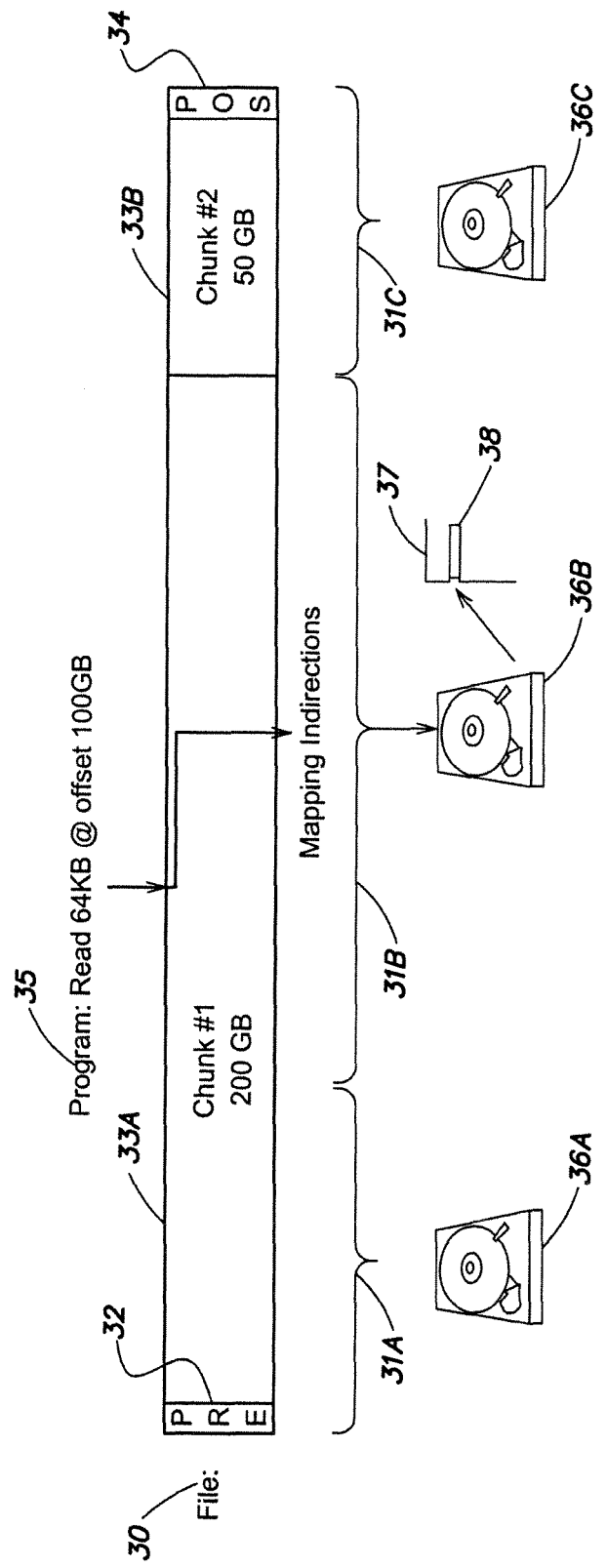
FIG. 1 is a schematic block diagram illustrating a process of mapping file-based linear offsets to physical locations on persistent storage.

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the terms "data" and "data element" are used interchangeably. As used herein, data means an opaque collection of data, e.g., any sequence of symbols (typically denoted "0" and "1") that can be input into a computer, stored and processed there, or transmitted to another computer. As used herein, data includes metadata, a description of other data. Data written to a storage system as described herein may be data elements of the same size, or data elements of variable sizes. In one embodiment, each data element may comprise an object stored in an object store.

A "storage system" as used herein may be any system or application for storing data to disk or other storage media, for example a file system, a block storage device, or other system. A storage system may use an identifier or name to reference each data element in storage. In one example, the name is a globally unique identifier (GUID), such as a hash of the data content, preferably a strong (collision resistant) hash of the data content. Other naming conventions are possible, as long as each data element has a name within the storage system that permits reconstituting the data stored to the user. In one embodiment a central server generates the names. Data names are usually fixed length binary strings intended for use by programs, as opposed to humans. A storage system has a mechanism for organizing and locating the stored data (e.g., a file system), which understands the format of the stored data and provides a mechanism (an abstraction layer referred to as a mapping or indirection) for accessing (referencing) each data element. An index (sometimes as referred to as a dictionary or catalog) of all the data may be used by the storage system in order to access (locate) each data element. Each record in the index may contain the name of a data element, its logical and/or physical location (address), a reference count (the current number of references to the data element by one or more applications), and other information concerning the respective data element. In one embodiment, each index entry includes a pointer that points to a physical block address on a disk where the data object is stored. In one embodiment a fixed algorithm may be used to locate the physical location on a disk where the data is stored.

A "persistent storage media" is a non-volatile data storage media, e.g., hard disk or flash memory, that preserves state.

Terminology

Virtual Machine [VM]: A software implementation of a machine (i.e., a computer) that executes programs like a physical machine.

Virtual Machine File [VMF]: One of many files that are stored in a hypervisor-specific format and describe a VM, or contain the VM's payload data (memory or disk contents).

Virtual Disk File [VDF]: A type of Virtual Machine File that represents a storage device (e.g., disk) to a VM which is capable of providing persistent storage. These are typically extremely large files.

Hypervisor Metadata [HM]: The information in a Virtual Machine File that describes the configuration and layout of a VM. This information is typically specific to a particular hypervisor. The VM is not able to modify Hypervisor Metadata.

Virtual Machine Payload [VMP]: The data in a Virtual Machine File that is visible to, and can be modified directly by programs (virtual machine code) executing inside the VM. The vast majority of a Virtual Disk File typically consists of Virtual Machine Payload.

File System Metadata [FSM]: Data stored by a file system to map the logical linearity of one or more files to the related locations of the particular file data elements in persistent storage.

Data Migration: Process of copying data from one location to another location. This involves reading data from a source and then writing it to a destination. If the source and destination devices are the same, locations of the source and destination files on that device must be different.

Data Transformation: Process of modifying data structures in one format to be compatible with data structures of another format.

File System Mechanics

Hypervisors use various file-based structures to store virtual machine information such as configuration, memory content and virtual disk content. Historically, these file-based structures must undergo a data migration and/or transformation to be compatible with hypervisors of a different type.

A file system consumes some amount of persistent storage and presents structured data storage in the form of directories and files. A file system consumer can access the contents of a file using linear offsets. These file-based linear offsets, to physical locations on persistent storage, are typically referred to as indirections. This is illustrated schematically in FIG. 1 wherein a file 30, comprising a pre-amble 32, payload 33 including Chunk #1 (33-A) and Chunk #2 (33-B), and a post-amble 34, is illustrated. A file system consumer, e.g., a computer program 35, wishes to read 65 kilobytes (KB) of data at offset 100 gigabytes (GB). An indirection table 31A-31C maps these file-based linear offsets to physical locations on a persistent storage media, such as disk storage 36A-36C. Here, the mapping indirections for three portions 31A, 31B, 31C of file 30 are to different physical locations on three different disk storage devices 36A, 36B, and 36C, respectively. A schematic illustration of the linear layout of a single disk drive is shown by reference no. 37, with 38 representing the desired 64 KB at offset 100 GB (i.e., the location of the particular part of the file data that is stored on a particular part of the disk drive 36B).

As illustrated in FIG. 1, the file system is responsible for tracking (using indirection table 31A-31C) the location of all data written by a file system consumer 35, so it can be read again at some later time. The file system is also responsible for erasure and re-using areas (if allowed) of that underlying persistent storage.

Prior Art Virtual Machine Conversion

Figure 2:
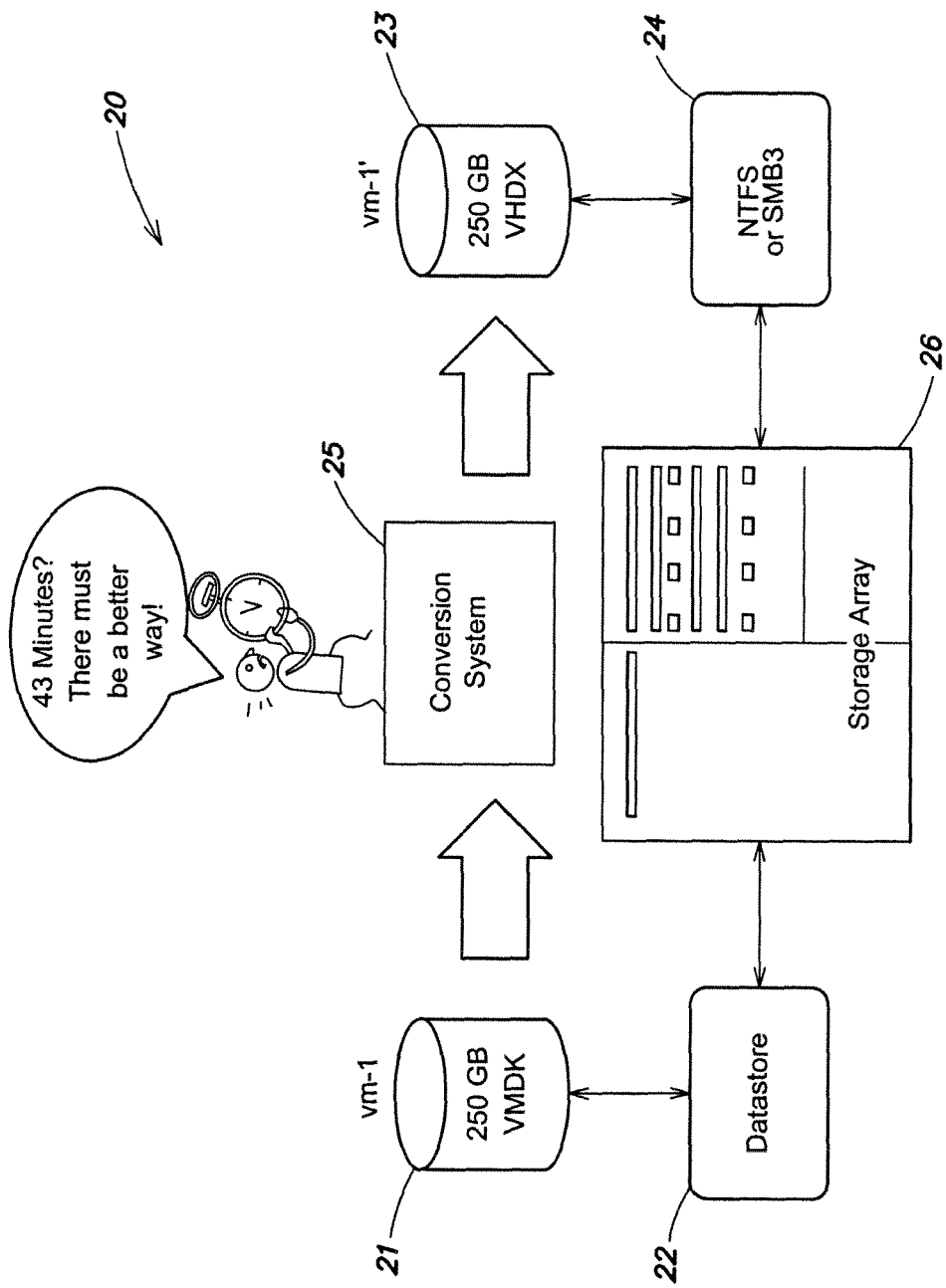
FIG. 2 is a schematic block diagram of a system for converting a virtual machine file from one hypervisor format to another, according to the prior art.
Figure 3:
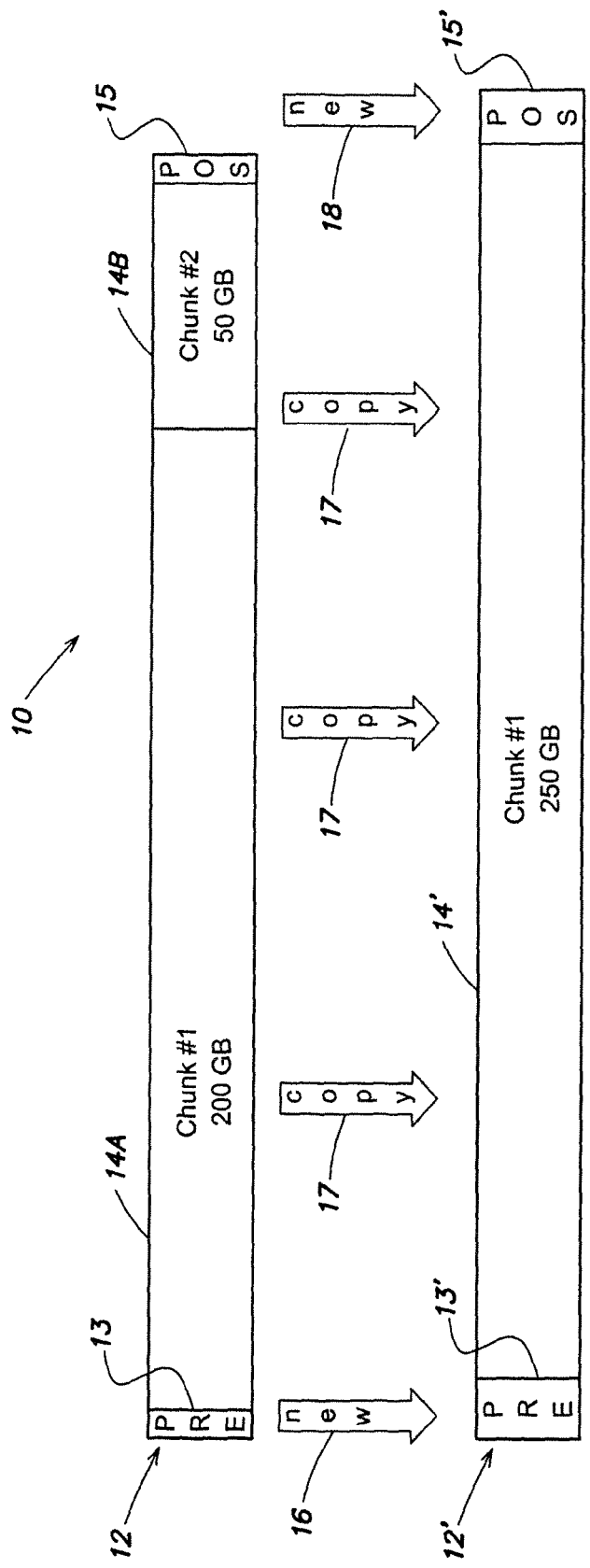
FIG. 3 illustrates a prior art conversion process for a virtual machine file.

FIGS. 2-3 illustrate one example of a prior art conversion tool (process) for converting a virtual machine file by both migrating and transforming the entirety of the file.

A source virtual machine file (vm-1) 21 in a first hypervisor format (e.g., VMware) includes a 250 gigabyte (GB) virtual machine payload stored in a datastore 22 residing on storage array 26. Datastore 22 may be a data repository comprising a set of related objects, wherein the objects are modeled using classes defined in a database schema, or as flat files that store data residing on storage array 26. In order to convert this source virtual machine file (vm-1) 21 to a destination virtual machine file (vm-1') 23 in a different hypervisor format (e.g., Microsoft Hyper-V), a conversion system (tool) 25 is used which is extremely resource intensive (see further description below). The resulting destination machine file (vm-1') 23, which includes a copy of all the payload data from vm-1, is also stored in the storage array 26. FIG. 2 shows another means 24 to access the storage array 26, such as a NTFS (New Technology File System, a proprietary file system of Microsoft Corporation) or a SMB3 (Server Message Block, version 3, also known as Common Internet File System (CIFS).

To illustrate the prior art conversion process, FIG. 3 illustrates an exemplary virtual disk file structure 12 which includes the following components:

- pre-amble (PRE) 13 is Hypervisor Metadata (HM) that stores overall information (configuration and layout) regarding the content of the virtual disk;
- Virtual Machine Payload (VMP) 14 consists of one or more, typically large, chunks (here Chunk #1 (14A) and Chunk #2 (14B)) of data stored in one or more locations; and
- (optional) some virtual disks have a post-amble (POS) 15 (for various reasons) that also comprises Hypervisor Metadata (HM).

In this prior art migration process, the preamble is migrated and transformed (see arrow 16 labeled "new" between the old PRE 13 and new PRE 13'). In the new (different) hypervisor format, the pre-amble 13' may end up a different size, as illustrated in FIG. 3.

The contents of each payload chunk are then migrated, i.e., read and written to a new location, with transformation as necessary. Source Chunk#1 (14A) with 200 GB of data and source Chunk #2 (14B) with 50 GB are converted to a single Chunk #1 (14') with 250 GB of data. This payload migration step (see arrows 17 labeled "copy") is extremely resource intensive as it requires:

- CPU and memory resources to buffer the data (payload) conversion and process;
- network bandwidth to read and write the entire data;
- Input/Output (I/O) bandwidth to read and write the entirety of the data;
- roughly as much free space as the size of the virtual disk file before migration.

The post-amble 15, if required, is also migrated and transformed (see arrow 18 labeled "new"). The resulting post-amble 15' may end up a different size as well.

In this example, assuming a 100 megabyte per second (MB/s) full duplex throughput (e.g., Gigabit Ethernet), conversion of a virtual disk file with a total 250 gigabyte (GB) payload would take over 43 minutes to migrate and transform with the prior art tool. This prior art process requires a large amount of time and memory for the following reasons:

1. Conversion system (25) has a limited amount of memory; therefore it must read the source VMF (21) in smaller chunks that fit in memory.
2. Once read from the source file, which is stored on the storage array (26), the data must then be written out to the destination file (23) which in this example is located on the same storage array.
3. At the end of the conversion, 25 may remove the source file (21) to complete the conversion process.
4. The 250 GB of data was therefore read from, and written back to the same storage array (26). This process uses:
   a. CPU processing time to manage the I/O
   b. A significant amount of network bandwidth.
5. This process is gated by the network throughput between the storage array (26) and the conversion system (25).
6. This process affects other programs using storage array (26) by reducing the available network bandwidth and IOPS available to process storage requests.
7. Conversion system (25) must read all data from the VMDK file (21) over the course of this operation.

The present invention substantially simplifies and renders the conversion more efficient, as described below.

Transformation without Payload Migration

One embodiment of the invention will now be described with regard to FIGS. 4-5. In this example, a file system 40 (illustrated schematically) stores everything (all data and metadata) in an object store which identifies data based on content. Thus all data and metadata in the object store comprises objects, and each object has a fingerprint (name) derived from the content of the object.

The file system stores the metadata objects (directories 42, files 43 and indirections 44) in a tree structure in order to provide file system consumers with access to the payload data (45). The file system also instructs the object store when it is safe to de-reference an object.

Figure 4:
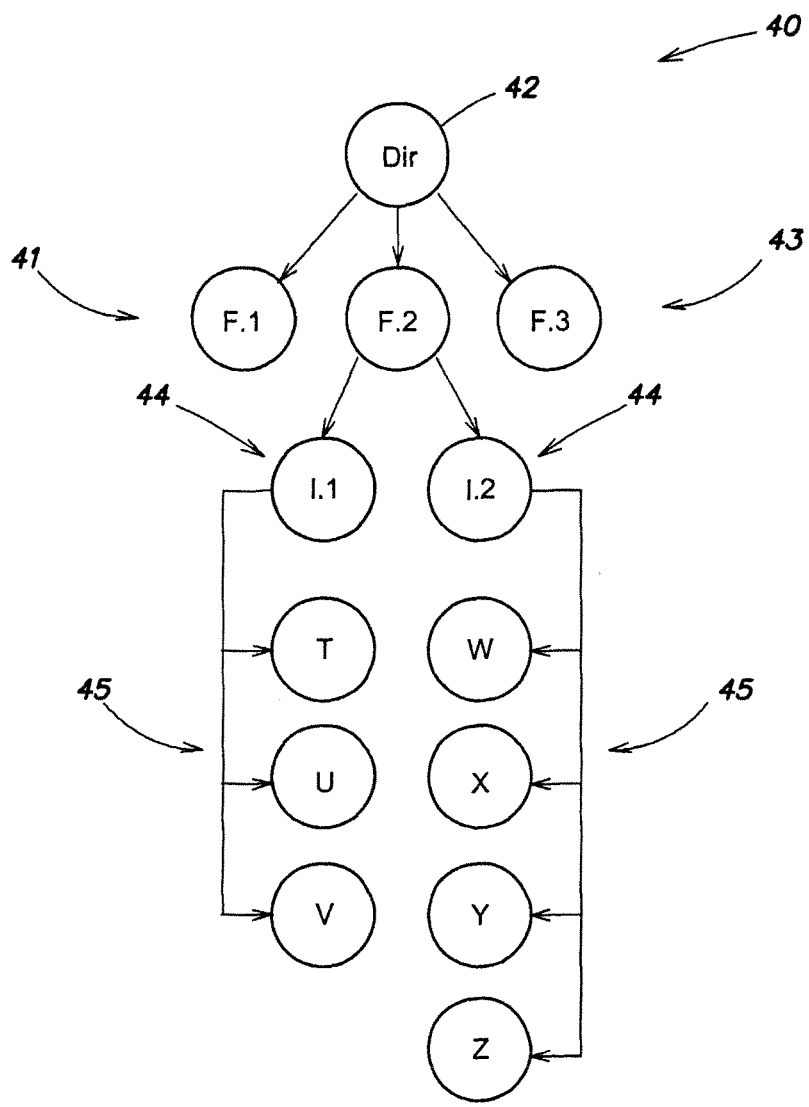
FIG. 4 is a schematic illustration of a file system utilizing a tree structure for accessing data and metadata objects stored in an object store, in accordance with one embodiment of the invention.
Figure 5:
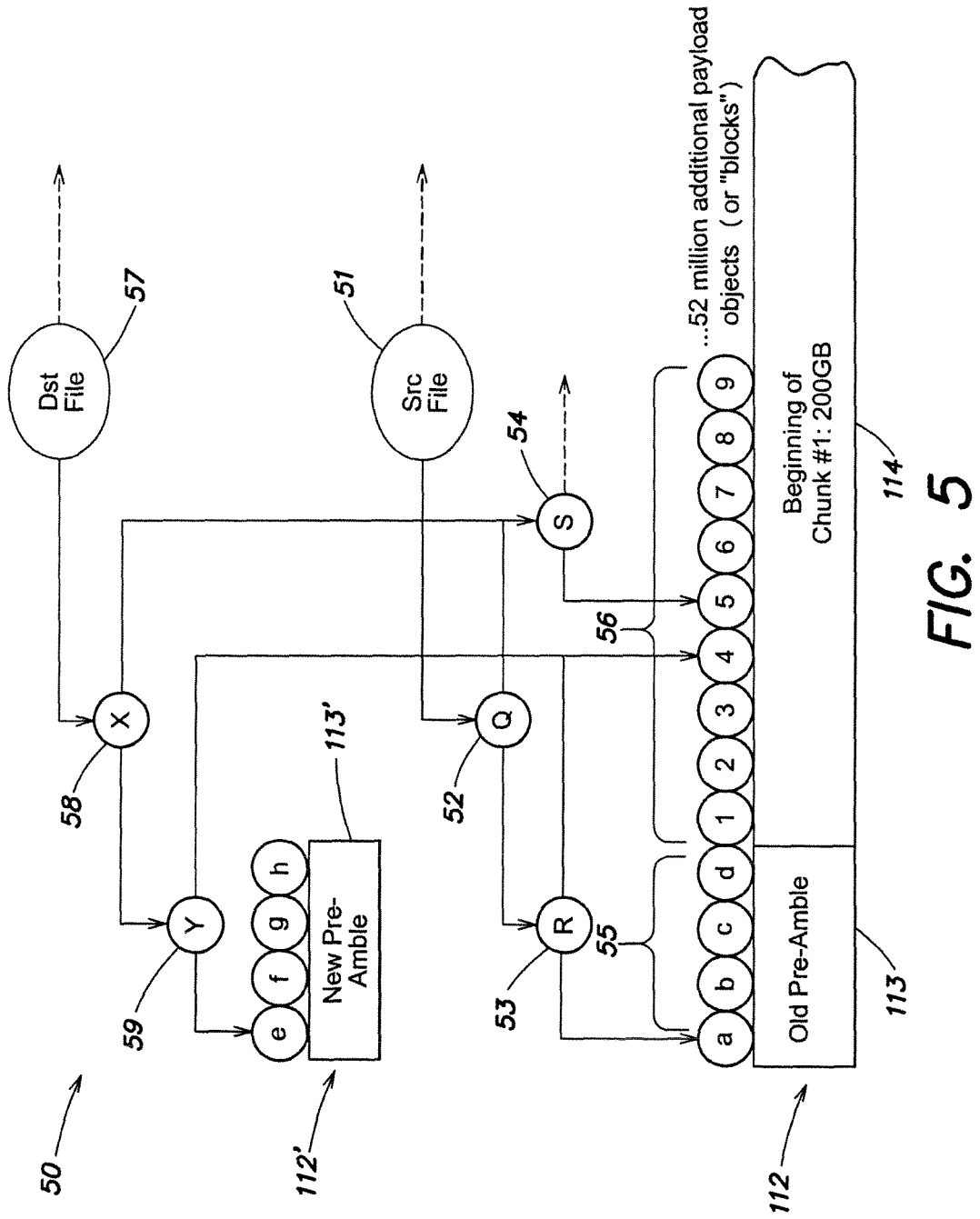
FIG. 5 is a schematic illustration of a conversion process according to one embodiment of the invention.

In the tree structure 41 of FIG. 4, a directory (Dir) at root node 42 points to three underlying file nodes 43, labeled F.1, F.2, and F.3. The second file node F.2 has two indirections 44, a first indirection labeled I.1 which references three payload data elements (objects) T, U, V, and a second indirection labeled I.2 which references four payload data elements (objects) W, X, Y, Z.

Utilizing this file system, the following example illustrates one embodiment of applicant's invention wherein a transformation of a source virtual machine file 112 in one hypervisor format to a destination virtual machine file 112' in another hypervisor format, is accomplished without copying (reading or writing) the virtual machine payload VMP. The process is illustrated in FIG. 5.

Beginning at step 1, a source virtual machine file (Src File 51) metadata includes three indirections 52-54, labeled Q, R, S, to various of the source metadata objects labeled, a, b, c, d, (of source ("old") pre-amble 113) and to payload objects 56 (of source payload 114) labeled 1, 2, 3, 4, 5, 6, 7, 8, 9 . . . (e.g., continuing with 52 million additional payload objects or "blocks").

In step 2, a new virtual machine file Dst File (57) is created for the destination of the transformation.

In step 3, the source preamble 113 is transformed and migrated (a, b, c, d → e, f, g, h) creating a new (destination) preamble 113'.

In step 4, new indirections 58, 59 (labeled X, Y respectively) are created to reference the new hypervisor metadata (e, f, g, h) of new (destination) preamble 113' and to the existing (source) virtual machine payload 114.

In step 5, the above process steps are repeated for any other source file hypervisor metadata.

In step 6, the original source file 51 and indirections (Q, R) 52, 53 that reference the source hypervisor metadata (a, b, c, d) are removed. Indirection 54 to the original payload is maintained as new indirection (X) 58 references 54.

In step 7, the extant (unreferenced) hypervisor metadata 55 (a, b, c, d) can be dropped (erased or removed).

The conversion is now complete. No virtual machine payload 114 was migrated.

In an alternative embodiment, where it is desired to clone a virtual machine file in another hypervisor format, the last two steps (6 and 7) are omitted (i.e., source file in first hypervisor format is maintained).

In a further alternative embodiment, a destination file record does not necessarily have to be created, but instead the content and name of the existing (source) file record can be modified to reflect the new indirection tree (as a modified step 6). At the end of the conversion process, the file will be renamed to match the destination hypervisor's format.

Use Cases

The present invention can be used in any of the following use cases involving virtual machine conversion:

Moving a VM to another hypervisor type, whereby the source files can be discarded following the conversion;

Restoring a VM from a backup taken when the VM was running on a hypervisor of a different type, whereby the source files can be discarded following the conversion;

Cloning a VM to another hypervisor type, whereby the source files must be retained following the conversion;

Performing a P2V (Physical to Virtual) data conversion of a block storage device (such as iSCSI or Fibre Channel) target, and converting it to a Virtual Machine File; and Performing a V2P (Virtual to Physical) data conversion of a Virtual Machine File into a block storage device (iSCSI or Fibre Channel).

In these and potentially other use cases, a data transformation is required, but a data migration of only the hypervisor metadata HM is all that is necessary to achieve the goal. The virtual machine payload VMP does not need to be migrated.

Flow Charts

FIGS. 6-10 are flow charts illustrating various embodiments of the invention for converting a virtual machine file from one hypervisor format to another hypervisor format.

Figure 6:
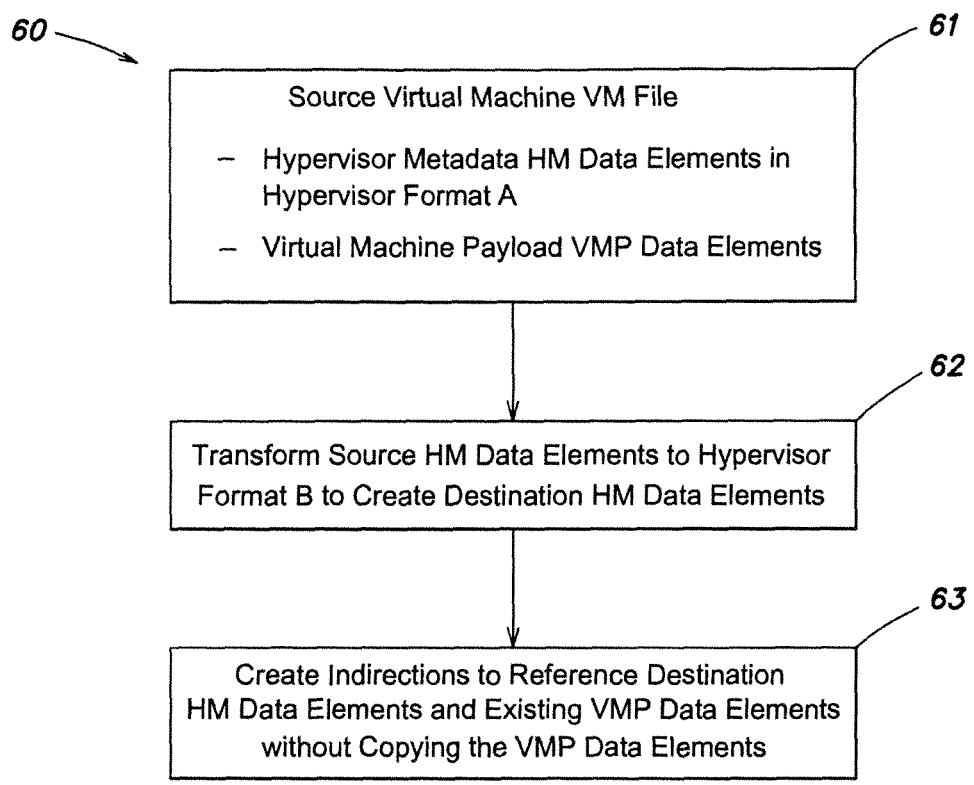
FIG. 6 is a flow chart of a process according to one embodiment of the invention for converting a virtual machine file from one hypervisor format to another hypervisor format.

FIG. 6 illustrates a process 60 beginning at first step 61 wherein a source virtual machine VM file is characterized by hypervisor metadata HM data elements in hypervisor format A, and virtual payload VMP data elements (which are hypervisor agnostic). In next step 62, the source HM data elements are transformed to hypervisor format B to create destination HM data elements. In next step 63, indirections are created to reference the newly created HM data elements. The destination file may use existing indirections in the file system and/or create new indirections to the existing stored VMP data elements without copying the VMP data elements.

In this example, the new destination file is essentially a "clone" of the source file adapted for running in a different (format B) hypervisor format. The source file may be maintained for running in the source (format A) hypervisor format. Both access the same VMP data. The VMP data may be updated by conducting a "quiesce" or flush of all outstanding writes, prior to creating the indirections (see FIG. 10).

Figure 7:
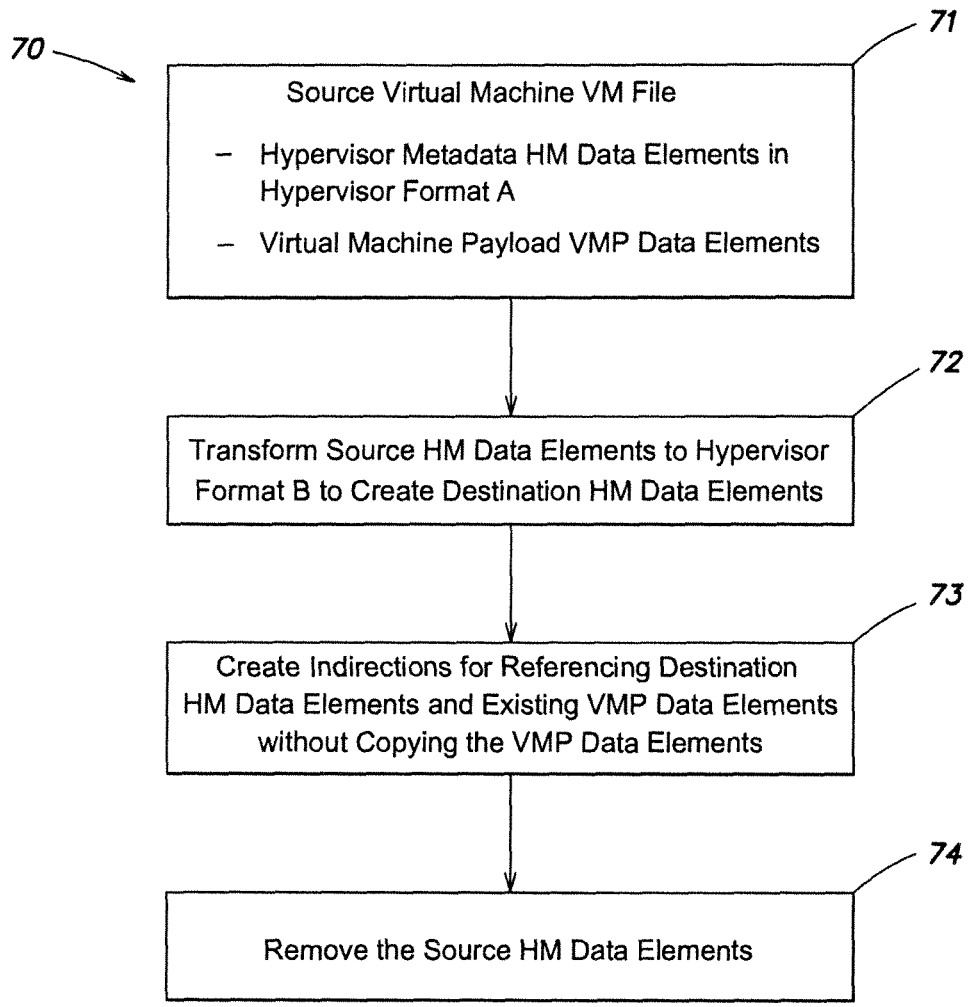
FIG. 7 is a flow chart of a process according to another embodiment of the invention for converting a virtual machine file.

FIG. 7 illustrates another process 70, wherein the first three steps 71-73 are the same as steps 61-63 of process 60 of FIG. 6. In FIG. 7, a fourth step 74 comprises removing the source HM data elements. This process, for example, can be used for moving a VM to another hypervisor type, whereby the source files can be discarded following the conversion.

Figure 8:
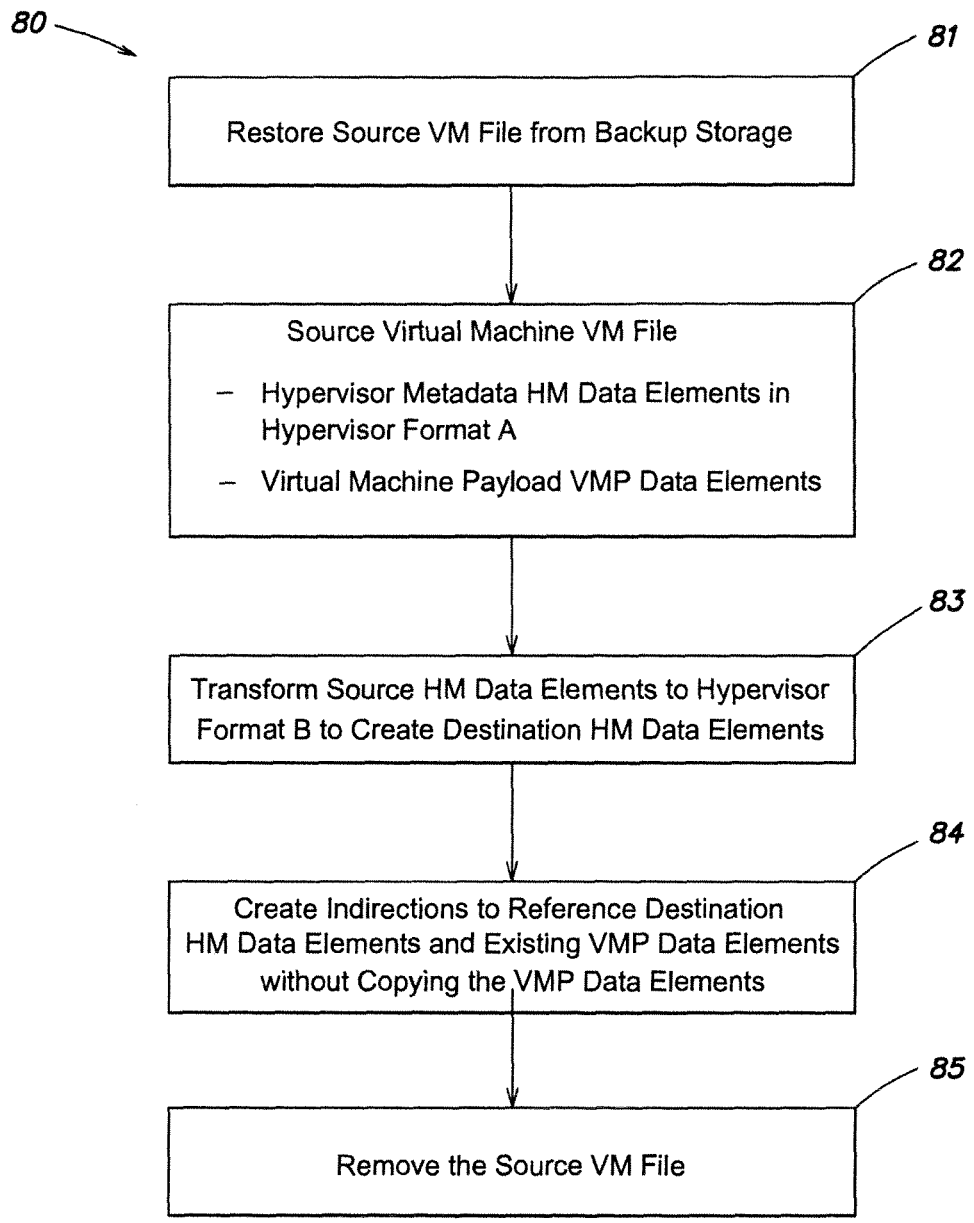
FIG. 8 is a flow chart of a process according to another embodiment of the invention for converting a virtual machine file.

FIG. 8 illustrates another process 80 including a first step 81 of restoring a source VM file from backup storage. The next three steps, 82-84, are the same as steps 61-63 of process 60 of FIG. 6. A fifth step 85, comprises removing the source VM file. This process 80 is one embodiment of a process or restoring a VM from a backup taken when the VM was running on a hypervisor of a different type, whereby the source files can be discarded following the conversion.

Figure 9:
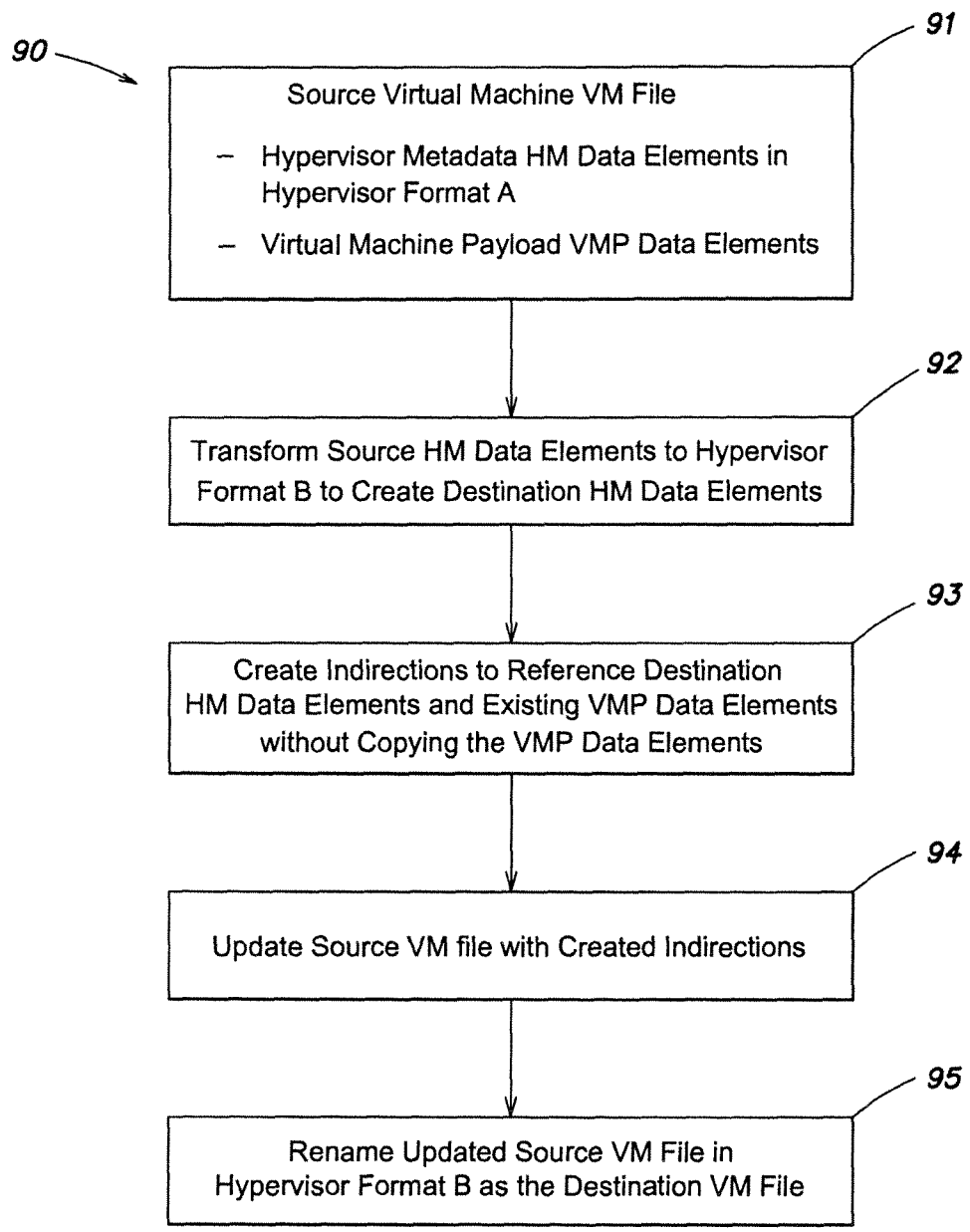
FIG. 9 is a flow chart of a process according to another embodiment of the invention for converting a virtual machine file.

FIG. 9 illustrates another process 90 in which the first three steps 91-93 are the same as steps 61-63 of process 60 of FIG. 6. Process 90 includes a fourth step 94, of updating the source VM file with the created indirections. In the next step 95, the updated source file is renamed in hypervisor format B as the destination VM file. The process of FIG. 9 is one example wherein the destination file record does not have to be created, but instead the contents and name of the existing file record are updated to reflect the new indirections and the file is renamed to match the destination hypervisor format B.

Figure 10:
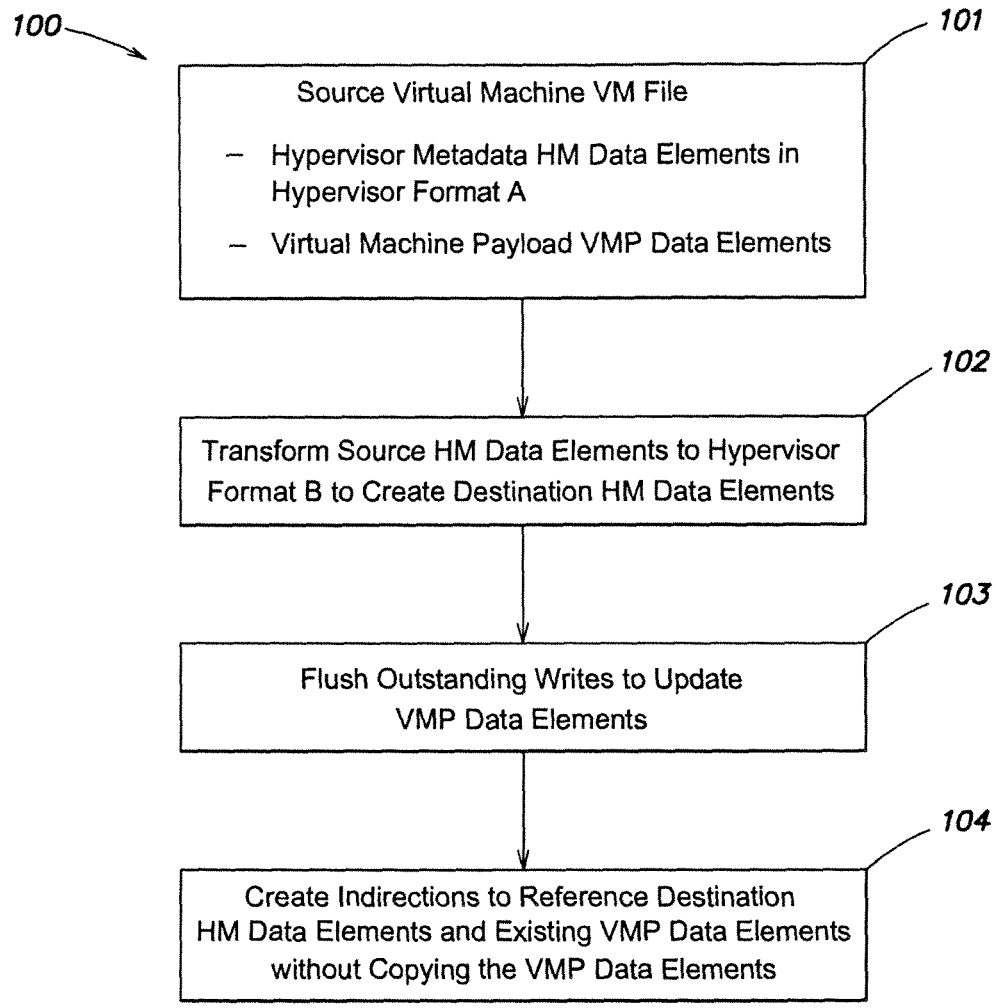
FIG. 10 is a flow chart of a process according to another embodiment of the invention for converting a virtual machine file.

FIG. 10 illustrates another process 100 wherein the steps 101, 102 and 104 correspond to steps 61, 62, 63 respectively of FIG. 6. In process 100, an additional (now third) step 103 is provided wherein the VMP data is updated following the transformation to "quiesce" (flush) all outstanding writes. This is then followed by creating the indirections (step 104).

Figure 11:
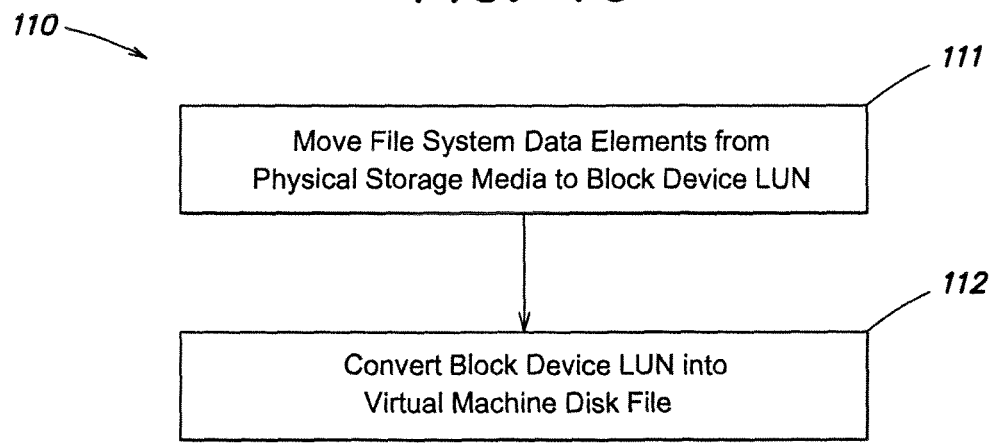
FIG. 11 is a flow chart of a process according to anther embodiment of the invention for creating a virtual machine file (for conversion)

FIG. 11 illustrates a process 110 for a physical-to-virtual (P2V) use case in which a virtual machine disk file is first created that can then be used in the conversion process of the present invention. In a first step 111, file system data elements on a first physical storage media are moved to a logical block addressing schema, e.g., a logical abstraction for specifying the locations of blocks of data stored on computer storage devices, typically secondary storage systems such as hard disks, in which only one number is used to address data and each linear base address describes a single block. There are known processes for moving computer file system data to a block device lun. In next step 112, the block device lun is converted into a virtual machine disk file; again, known processes can be used for this conversion. In one embodiment, the block disk lun is represented inside the storage system as a file in a file system, so that the subsequent conversion process is subsequently identical to other file-to-file conversions as previously described.

In the (opposite) virtual-to-physical (V2P) use case, the conversion process of FIG. 6 is followed by converting the destination virtual machine disk file to a block device lun for storage on a physical storage media.

These and other embodiments of the invention will be apparent to the skilled person from the foregoing description.

Network of Nodes

Figure 12:
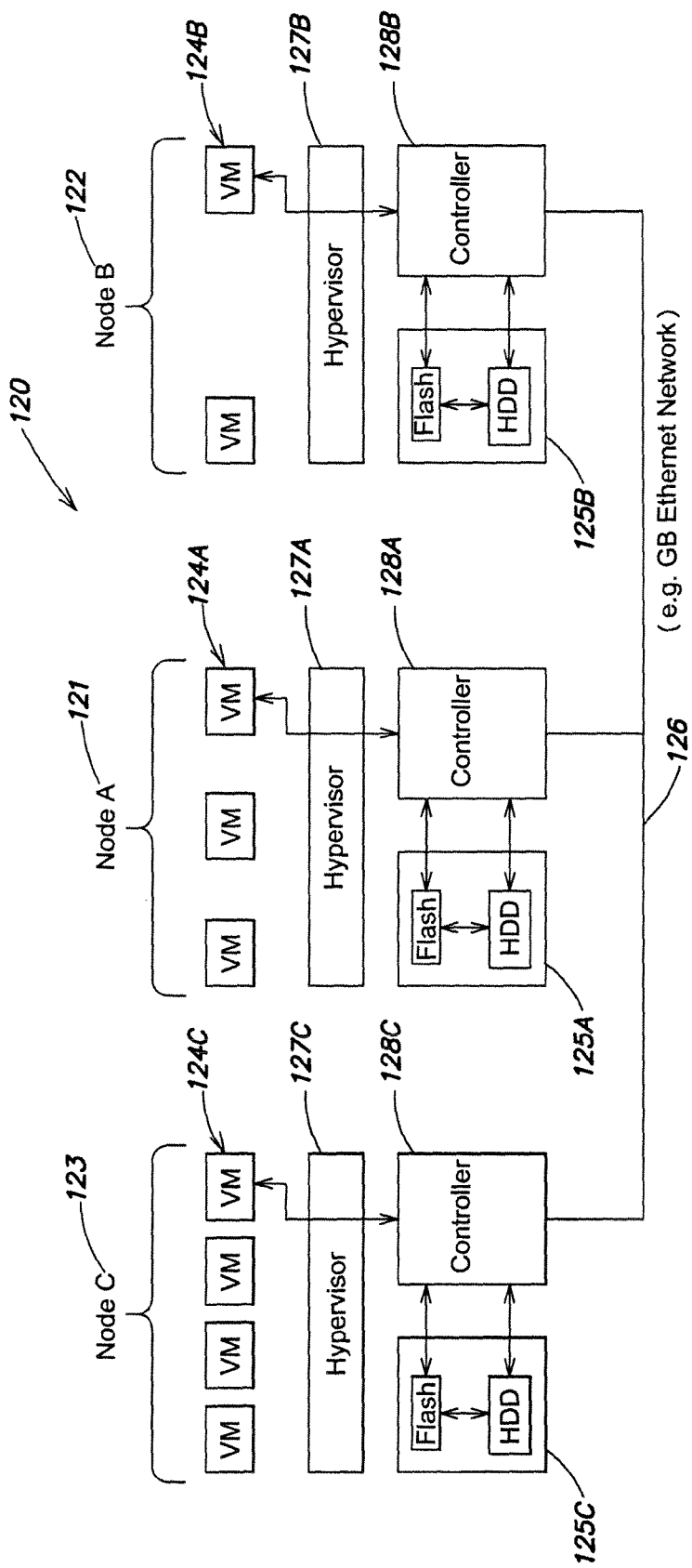
FIG. 12 is a schematic diagram of a network of nodes, each node running one or more virtual machines.

FIG. 12 illustrates one environment in which the present invention may be utilized, namely a group 120 of networked nodes, each node 121, 122, 123 having one or more virtual machines (guest VM's) 124A-C running on the local node and accessing local storage 125A-C on the node. The network 126 aggregates the local storage across the nodes into one storage pool that can be partitioned into one or more data stores. By localizing storage at the node, the majority of read requests by the virtual machines on the node are local (serviced by access to local storage within the same node). Networking further enables the coordination of work on two or more virtual machines located on separate physical servers (nodes) to ensure maximum application up time (loss of one node does not disrupt data access from the virtual machines). The nodes in the network balance resources to optimize I/O performance and capacity utilization. In addition, virtualization software running on each node enables automatic migration of virtual machines to another physical server (another node) in case of hardware failure or resource limitation.

As shown in FIG. 12, each node 121, 122, 123 (labeled nodes A, B, C respectively) includes its own (one or more) virtual machines 124A-C, hypervisor software 127A-C, virtual storage controller 128A-C, and local storage 125A-C. The hypervisor allows multiple virtual machines to run on a single physical host and mediates all input/output (IO) operations (via the controller), including read and write requests. The local storage may include solid state drive SSD or Flash storage devices for quick access to data that is frequently used. Data that is less frequently used may be stored on less expensive hard disk storage HDD. The virtual storage controller on each node is connected by a network 126 (e.g., GB Ethernet) for communications between nodes.

FIG. 12 is just one example of a distributed environment for running virtual machines that may be used in the present invention, and is not meant to be limiting.

De-Duplication

In one embodiment of the present invention, all data is de-duplicated at inception, in real time, before the data is written to storage. By de-duplicating the data before it is written to hard disk drive (HDD), there is a substantial reduction in HDD input-output (IO) operations. In one embodiment, the de-duplication process produces fine-grained data elements, namely a granular size on the order of kilobytes, such as 2 KB, 4 KB or 8 KB data elements. These data elements are then utilized across all data lifecycle phases, including primary, backup, WAN and archive. In addition, these fine-grain data elements are utilized across different storage media tiers, such as DRAM, Flash, HDD and Cloud. In the present embodiment, the de-duplication occurs at the primary storage level, as opposed to postponing de-duplication to the back-up level or replication level. The full benefits of de-duplication are thus achieved at every point in the lifecycle of the data and across all storage media tiers.

As used herein, the de-duplication process comprises finding and eliminating redundant data within a given data set in reference to the whole available repository of data.

In another embodiment, the data may also be compressed, namely finding and eliminating data within a given data set, in relation to other data within the same data set.

In yet another embodiment, the data (in addition to being de-duplicated and compressed) may also be optimized, namely identifying the file types and making real time decisions on whether and where to store that data, e.g., for improved storage efficiency, performance, and/or bandwidth usage.

In the de-duplication process, at creation the data is scanned, analyzed and compared to an index or table that has catalogued all existing elements in the data set. If determined to be redundant, the data is deleted; if determined to be new, the data is written to storage. Then, pointers and indexes are updated so that the system can keep track of all data elements in all of their locations, while maintaining an understanding of the full data sets (pre-duplication).

There are multiple advantages of de-duplicating at the primary storage level. In one example, for any two virtual machines running a common operating system, (e.g., Windows 2008), the virtual machines will have a large set of data elements in common. Replicating a virtual machine to another node does not require sending these common data elements (because they already exist at the remote node). As another example, booting 100 Windows virtual machine at the same time may cause roughly 10,000 MB of random disk reads. However, by eliminating disk reads to the common data, the same workload will cause only roughly 100 MB of reads, as all of the data that Windows needs to boot is common between the 100 virtual machines. This is a savings of 100× in disk input/output operations.

These and other benefits of the invention can be achieved in this and other storage environments.

Data Store

A data store is a data repository comprising a set of related data elements. Data stores can be of different types, including file systems and databases (relational databases and object-oriented databases). VMware uses "datastore" to refer to a storage device capable of storing one or more files for one or more virtual machines.

In one embodiment of the invention, the data store comprises an object store that contains a set of related objects. One example of an object store is described in U.S. Pat. No. 8,478,799 to Beaverson et al., issued 2 Jul. 2013, which is hereby incorporated by reference in its entirety.

Figures 13A, 13B, 13C:
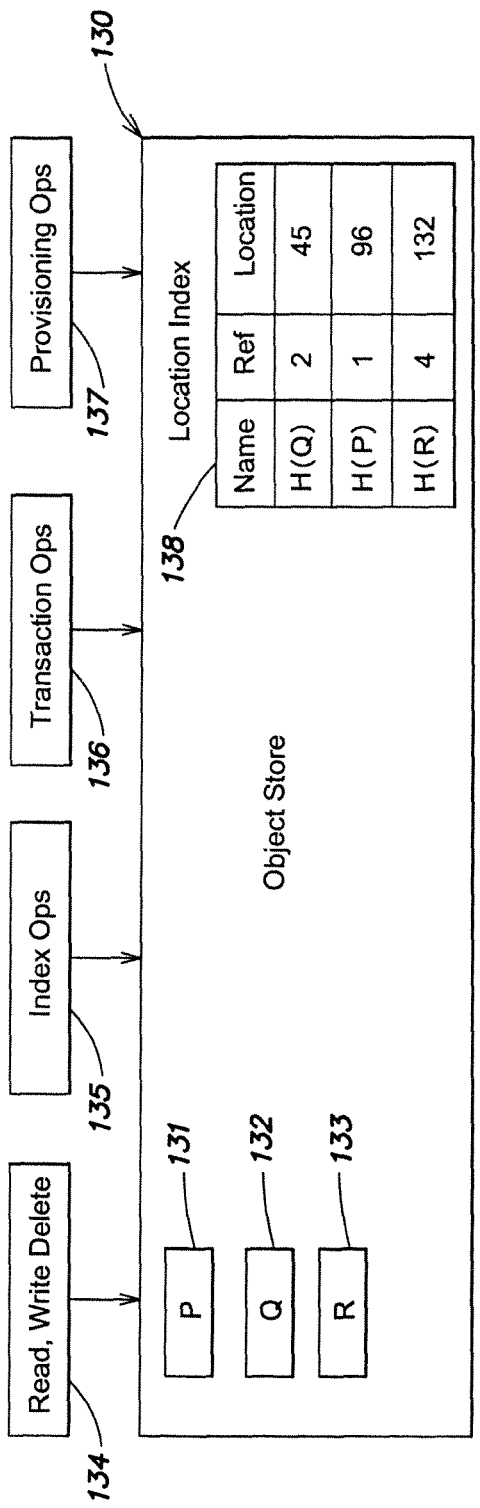

FIG. 13A illustrates one example of an object store 130 containing objects, examples of which are labeled P, Q, R (131-133 respectively). In this example, all data of the file system, including directories, files, and payload data, are represented as objects. The objects have been de-duplicated prior to storage in the object store, and are of a fine grain size, on the order of KB, e.g., 2 KB, 4 KB or 8 KB.

Each object has a name which is a digest (hash) of the object's entire content. The object names are denoted in the location index 138 by H(P) H(Q) H(R). The index structure 138 keeps track of object names, object locations, and object references. An object's reference is incremented each time the object is written or otherwise referenced by another object or data structure. The file system may generate what it thinks are many copies of the object, however the object store only stores one, and keeps track of how many references to that object exist in the file system. Thus, the reference count is the number of times the object is referenced by another object or other data structure, and an object may be safely de-allocated or deleted (e.g., garbage collection) when its reference count drops to zero.

The object store has several interface classes. The read, write, delete interface 134 performs the stated functions for objects. An object deletion in this context is really a decrement of the object's reference count. Storage of the object inside the object store is released only when the reference count goes to zero.

The indexing operations 135 enable enumeration of objects by name, reference count adjustments, and looking up of objects by name.

The object store has transactional semantics (ACID) properties, and transaction boundaries are managed through the transactional operations 136.

A provisioning interface 137 enables object stores to be created, deleted, merged, split and aggregated.

The location index 138 is a map whose primary key is the object name. There is an index entry for every object in the system; each entry contains the object name, the object reference count, and a physical location. If the object is on a physical disk, the location may be a logical block number (LBN). If the object is hosted by a hosting provider (e.g., Amazon) then it would be a reference to the Cloud object. Additional fields may be provided for various purposes, such as indicating whether an object is stored compressed or encrypted.

FIG. 13B-13C illustrate two other data structures utilized by the object store. A directory 139 is a mapping of file system inode number (an integer) to file name (a string). The mapping can take various forms, including but not limited to, a linear list, B-trees and hash maps.

An inode map 140 translates the inode numbers in directory 139 to an object name. The inode map may have reserved locations for particular objects. For example, index 0 is a snapshot of the file system at time T. Index 1 is a superblock. The other 3 indices are digests (hashes) of three files named foo, bar and root.

The mapping of inode number (integer) and object name preserves file system semantics. An inode number is central to the file system, as many user level activities reference the inode number. In the present embodiment, the object name, derived from the content of the object, changes as the file data changes. Using the indirection table 140, an inode number can stay constant, but the associated object name can change as the file data (corresponding to the inode number) changes. Further, the inode map itself is an object and the digest (hash) of the inode map object comprises a snapshot of the file system. Once you have the snapshot fingerprint, one can continue working on the file system (writable snaps) and remember it for future use (e.g., for disaster recovery). One can also publish the snapshot fingerprint to anther system, sitting on a distant store. While the other object store may not fully host all of the snapshot data (objects), the mechanism described is fully consistent and usable.

A strong hash is used to generate object names. The object name is thus a globally unique fingerprint derived from the content of the object and can be used to access the object in the object store.

In a traditional file system, the root directory is at a known inode number, and in inode map 140, that is also the case.

These and other components and variations of data stores and file systems are known to those skilled in the art. The present example is not meant to be limiting.

Computing and Storage Environment

The previously described methods may be implemented in a suitable computing and storage environment, e.g., in the context of computer-executable instructions that may run on one or more computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

Figure 14:
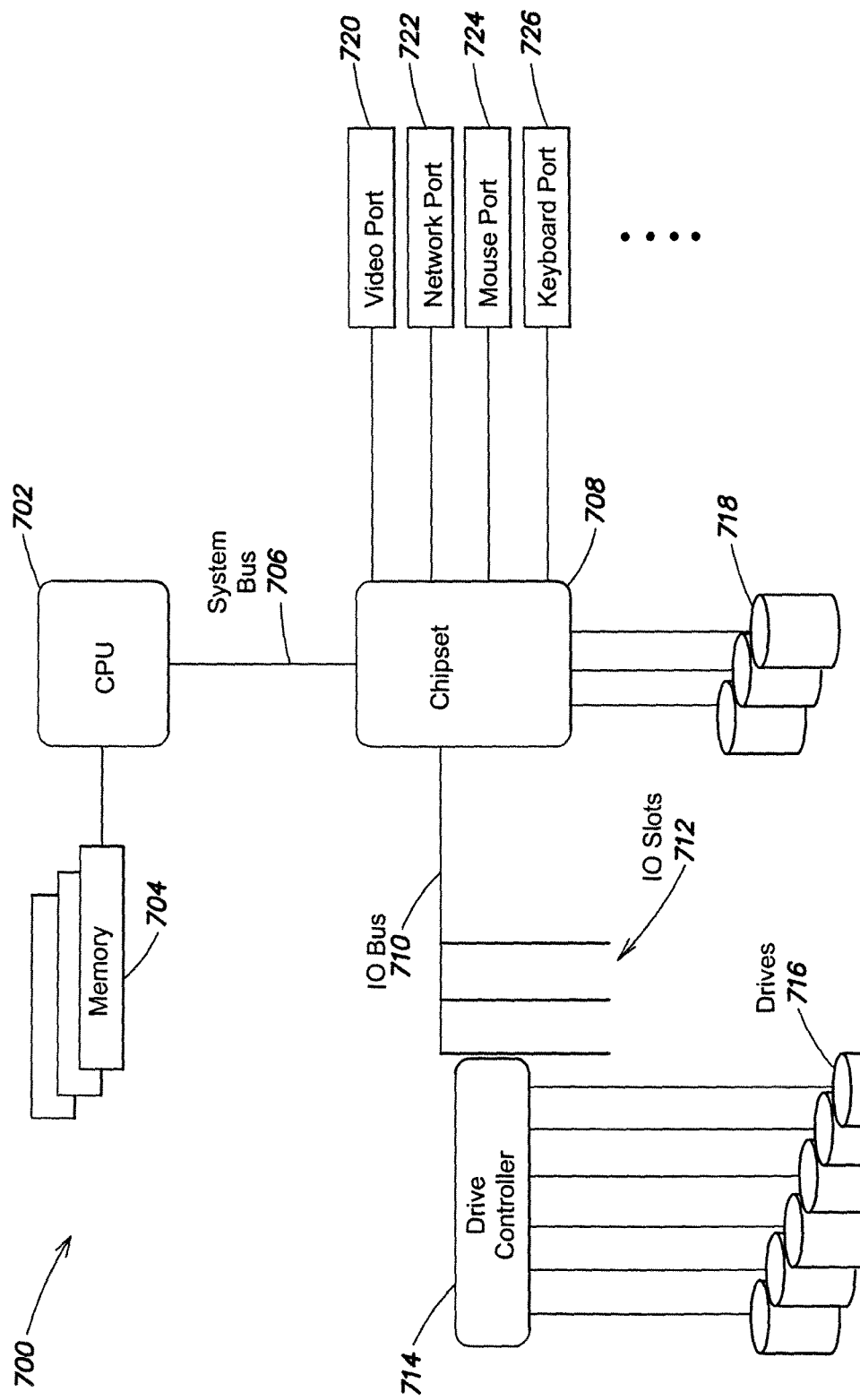
FIG. 14 is a schematic diagram of a general system configuration for communications between a computer and a plurality of disk storage devices.

Referring now to FIG. 14, there is illustrated one example of a general system configuration 700 for communications between a computer and a plurality of disk storage devices. The disk storage can be any of various storage devices in which data are digitally recorded by various electronic, magnetic, optical or mechanical methods on a surface of one or more rotating disks, including hard disk drives, floppy disk drives and optical disk drives. A CPU 702 is shown attached to system memory 704, and a system bus 706 connects the CPU to chipset 708. The chipset is connected via an IO bus 710 and multiple IO slots 712, to any of various input/output devices, such as a drive controller for connecting a plurality of disk drives 716. The chipset may also be connected to other storage devices 718. The chipset may include one or more of a video port 720, a network port 722, a mouse port 724, a keyboard port 726, etc.

What has been described above includes examples of the present invention. It is, of course, not possible to describe every conceivable combination of components or methodologies for purposes of describing the present invention, but one of the ordinary skill in the art will recognize that further combinations and permutations of the present invention are possible. Accordingly, the present invention is intended to embrace all such alternations, modifications and variations that fall within the present disclosure and/or claims.

The invention claimed is:

1. A method of transforming a source virtual machine (VM) file from one hypervisor format to a different hypervisor format without migration of payload data, wherein the source VM file comprises hypervisor metadata data elements, in a source hypervisor format, and payload data elements, the metadata and payload data elements being stored as objects in an object store on a persistent storage media, and wherein indirections are used by a file system or storage system to access the data elements in the object store, the method including steps of:
    transforming the source metadata data elements to create destination metadata data elements in a destination hypervisor format different from the source hypervisor format;
    maintaining the locations of the payload data elements stored in the object store during the conversion of the metadata data elements from source to destination file formats without copying the payload data elements; and
    creating new indirections to reference the destination metadata data elements in the destination hypervisor format and maintaining indirections to reference the existing stored payload data elements in the object store.

2. The method of claim 1, further comprising:
    removing the source metadata data elements from the object store after creating the destination metadata data elements.

3. The method of claim 2, wherein the source metadata data elements include directory, file and indirection data elements.

4. The method of claim 1, wherein the source VM file is a source virtual disk VD file.

5. The method of claim 1, wherein the source VM file is a virtual memory image file.

6. The method of claim 1, wherein the method includes restoring the source VM file from backup storage for running a destination VM file, comprising the destination metadata data elements and payload data elements, on a hypervisor of the different hypervisor format.

7. The method of claim 1, further comprising updating the source VM file with the created indirections and renaming the updated source VM file in accordance with the different hypervisor format to create the destination VM file.

8. The method of claim 1, wherein the method includes cloning the source VM file to a different hypervisor format and maintaining the source VM file in the object store.

9. A computer program embodied in a non-transitory machine readable storage device comprising program code which, when executed by a processor, performs the steps of method claim 1.

10. The method of claim 1, implemented in one or more of digital electronic circuitry, computer hardware, firmware, a computer program in a non-transitory machine readable storage device, or combinations thereof.

11. The method of claim 1, wherein a file system accesses the data elements as object in the object store and the method further comprises maintaining a location index of the file system for mapping data element names and physical locations of the data elements.

12. The method of claim 11, wherein the location index further comprises reference counts for the data elements.

13. The method of claim 11, wherein the names, location index and data elements comprise a file system.

14. The method of claim 11, wherein the mapping is indexed by an offset into the content of the file, and comprises a linear list, a tree structure, or an indirection table.

15. The method of claim 1, wherein a storage system accesses the data elements as objects in the object store.

16. The method of claim 1, wherein each object has a globally unique name derived from the content of the object and used to access the object in the object store.

17. The method of claim 16, including adding, modifying or deleting an object of the VM file and generating a new file object name.

18. The method of claim 16, wherein the object store contains an index of object names, object physical locations and object reference counts.

19. The method of claim 16, wherein the object name comprises a hash digest of the object content.

20. A computer system including a memory and a hardware processor in communication with the memory, the processor executing program instructions for transforming a source virtual machine (VM) file from one hypervisor format to a different hypervisor format without migration of payload data, wherein the source VM file comprises hypervisor metadata data elements, in a source hypervisor format, and payload data elements, the metadata and payload data elements being stored as objects in an object store on a persistent storage media, and wherein indirections are used by a file system or storage system to access the data elements in the object store, including steps of:
  transforming the source metadata data elements to create destination metadata data elements in a destination hypervisor format different from the source hypervisor format;
  maintaining the locations of the payload data elements stored in the object store during the conversion of the metadata data elements from source to destination file formats without copying the payload data elements; and
  creating new indirections to reference the destination metadata data elements in the destination hypervisor format and maintaining indirections to reference the existing stored payload data elements in the object store.

* * * * *